(12) United States Patent
Sun

(10) Patent No.: US 7,522,184 B2
(45) Date of Patent: Apr. 21, 2009

(54) 2-D AND 3-D DISPLAY

(76) Inventor: Li Sun, 511 Windmere Way, New Hope, PA (US) 18938

(*) Notice: Subject to any disclaimer, the term of this patent is extended or adjusted under 35 U.S.C. 154(b) by 0 days.

(21) Appl. No.: 11/840,973

(22) Filed: Aug. 19, 2007

(65) Prior Publication Data

US 2008/0030574 A1    Feb. 7, 2008

Related U.S. Application Data

(63) Continuation-in-part of application No. 11/685,589, filed on Mar. 13, 2007, which is a continuation of application No. 11/092,889, filed on Mar. 29, 2005, now Pat. No. 7,227,568.

(60) Provisional application No. 60/839,255, filed on Aug. 22, 2006, provisional application No. 60/558,898, filed on Apr. 3, 2004.

(51) Int. Cl.
H04N 7/18 (2006.01)

(52) U.S. Cl. .......................... 348/53; 348/51

(58) Field of Classification Search .............. 348/42–61
See application file for complete search history.

(56) References Cited

U.S. PATENT DOCUMENTS

| | | | |
|---|---|---|---|
| 4,829,365 A | 5/1989 | Eichenlaub | 358/3 |
| 5,192,969 A | 3/1993 | Igarashi et al. | 355/12 |
| 5,469,295 A | 11/1995 | Burke | 359/478 |
| 5,553,203 A | 9/1996 | Faris | 395/115 |
| 5,629,797 A | 5/1997 | Ridgway | 359/464 |
| 5,686,975 A | 11/1997 | Lipton | 349/15 |
| 5,805,250 A | 9/1998 | Hatano et al. | 349/96 |
| 5,835,133 A | 11/1998 | Moreton et al. | 348/49 |
| 5,850,269 A | 12/1998 | Kim | 349/15 |
| 5,917,562 A | 6/1999 | Woodgate et al. | 349/15 |
| 5,973,727 A | 10/1999 | McGrew et al. | 348/41 |
| 5,982,538 A | 11/1999 | Shikama et al. | 359/465 |
| 6,011,581 A | 1/2000 | Swift et al. | 348/58 |
| 6,016,159 A | 1/2000 | Faris | 348/57 |
| 6,020,941 A | 2/2000 | Ma | 349/15 |
| 6,038,071 A | 3/2000 | Chikazawa | 358/464 |
| 6,094,216 A | 7/2000 | Taniguchi et al. | 348/51 |
| 6,137,456 A | 10/2000 | Bhagavatula et al. | 345/7 |
| 6,141,465 A * | 10/2000 | Bischel et al. | 385/4 |

(Continued)

OTHER PUBLICATIONS

*VREX 3D Stereo Converter Kit, Instant 3D! Turn any notebook computer into a stunning 3D stereoscopic display!*, www.vrex.com.

Primary Examiner—Andy S Rao
(74) Attorney, Agent, or Firm—Robert Platt Bell

(57) ABSTRACT

A method and apparatus of light strength controlling, more specifically a method and apparatus of light controlling on its different appearance channels in different strength and further in different colors. A method and apparatus of controlling a pixel appears in different color through different appearance visual channels, and further forms different images through different appearance channels. A new type of display device displays different images through different appearance channels at same time and a method and apparatus of constructing device of this type. A method and apparatus of generating image data signals to construct and render different images on such type display device observed through different appearance channels, more specifically, display 2-D and stereo 3-D images on screen at same time.

26 Claims, 10 Drawing Sheets

U.S. PATENT DOCUMENTS

| | | | |
|---|---|---|---|
| 6,215,464 B1 | 4/2001 | Jensen | 345/84 |
| 6,252,707 B1 | 6/2001 | Kleinberger et al. | 359/465 |
| 6,259,665 B1 * | 7/2001 | Nagasato | 369/53.19 |
| 6,259,865 B1 | 7/2001 | Burke et al. | 396/327 |
| 6,320,629 B1 | 11/2001 | Hatano et al. | 349/15 |
| 6,348,957 B1 | 2/2002 | Yamazaki et al. | 349/15 |
| 6,359,664 B1 | 3/2002 | Faris | 349/15 |
| 6,392,690 B1 | 5/2002 | Fujii et al. | 348/59 |
| 6,411,327 B1 | 6/2002 | Kweon et al. | 348/42 |
| 6,417,895 B1 | 7/2002 | Tabata et al. | 349/15 |
| 6,437,915 B2 | 8/2002 | Moseley et al. | 359/465 |
| 6,445,406 B1 | 9/2002 | Taniguchi et al. | 348/51 |
| 6,456,432 B1 | 9/2002 | Lazzaro et al. | 359/464 |
| 6,522,310 B1 | 2/2003 | Kim | 345/6 |
| 6,546,208 B1 | 4/2003 | Costales | 396/324 |
| 6,556,236 B1 | 4/2003 | Swift et al. | 348/56 |
| 6,563,553 B1 | 5/2003 | Faris | 349/5 |
| 6,570,629 B1 | 5/2003 | Hirakata et al. | 349/15 |
| 6,672,722 B2 | 1/2004 | O'Conner | 353/34 |
| 6,727,886 B1 | 4/2004 | Mielekamp et al. | 345/7 |
| 6,734,923 B2 | 5/2004 | Kwon et al. | 349/15 |
| 6,801,263 B2 | 10/2004 | Sato et al. | 349/15 |
| 2001/0015753 A1 | 8/2001 | Myers | 348/51 |
| 2002/0054430 A1 | 5/2002 | Takikawa | 359/462 |
| 2002/0085280 A1 | 7/2002 | Jung | 359/465 |
| 2002/0090769 A1 | 7/2002 | Tokuhiro et al. | 438/153 |
| 2002/0145682 A1 | 10/2002 | Kwon et al. | 349/15 |
| 2002/0154215 A1 | 10/2002 | Schechterman et al. | 348/51 |
| 2002/0163600 A1 | 11/2002 | Divelbiss et al. | 349/15 |
| 2003/0067563 A1 | 4/2003 | Tomono | 349/15 |
| 2003/0133007 A1 | 7/2003 | Iijima et al. | 348/46 |
| 2004/0212550 A1 | 10/2004 | He | 345/6 |

* cited by examiner

2-D AND 3-D DISPLAY

CROSS-REFERENCE TO RELATED APPLICATIONS

The present application claims priority from Provisional U.S. Patent Application Ser. No. 60/839,255, filed Aug. 22, 2006, and incorporated herein by reference; The present application is also Continuation-In-Part of U.S. patent application Ser. No. 11/685,589, filed Mar. 13, 2007, and incorporated herein by reference; application Ser. No. 11/685,589 is in turn a Continuation of U.S. patent application Ser. No. 11/092,889, filed Mar. 29, 2005, now U.S. Pat. No. 7,227,568, and incorporated herein by reference; application Ser. No. 11/092,889 claims priority from Provisional U.S. Patent Application Ser. No. 60/558,898, filed Apr. 3, 2004, and incorporated herein by reference; application Ser. No. 11/685,589 claims priority from Provisional U.S. patent application Ser. No. 60/839,255, filed Aug. 22, 2006 and incorporated herein by reference.

FIELD OF THE INVENTION

The presented invention relates to generic display device and display method and apparatus, more specifically, related to multi-vision image display device and method. It particularly relates to a three-dimensional (3-D) image display with polarized light, and more specifically, relates to a two-dimensional (2-D) and three-dimensional (3-D) uniformed displaying method and apparatus.

BACKGROUND OF THE INVENTION

In general, electrical image displaying is a process of decomposing an image to small units and displaying them on display device screen separately. When the decomposed unit is small enough, these separate components on display screen may no longer be separated by human eyes and thus constructs the complete, smooth image on the device screen. These decomposed small units of an image are called pixels, an independent structure on device screen that displays an image pixel is called a pixel cell, or a cell in short.

A pixel may be monochromatic or a number of different colors. To construct a colored pixel, a pixel is further decomposed into primary color components. Primary colors are a set of colors that any color in the color space may be generated from them by mixing different volumes of primary colors together in theory. There are different primary color sets. One of the popular primary color set is red, green, and blue for example.

After chosen primary color set, a pixel cell is further divided into multiple sub cells, call color cells, each color cell represents one primary color in the chosen primary color set. By controlling light volumes from each color cell in a pixel, a pixel may have many different colors and brightness levels.

Humans perceive the real world through two views obtained by both eyes. The human brain interprets them, generates the space distance from them and forms a 3-D vision. A 3-D display simulates this observing process. The different eyes of an observer view slightly different images like human observes the real world. The images observed by left and right eyes are called the left image and right image, they are also referenced as a stereo image pair.

Liquid Crystal (LC) is a type of material has one common property: its molecules in their natural status are arranged in a loosely ordered fashion with their long axis parallel; When they come into contact with a finely grooved surface, molecules line up parallel along grooves; When an electric field is applied on it, the molecules rearrange themselves with the long axis direction along with the electric field direction.

When light pass through LC, the light oscillation direction follows the long axis direction of the LC molecules. When LC is sandwiched between two plates with the opposite surfaces finely grooved and the groove directions of two plates is in a certain degree, Light oscillation direction changes the same degree when light passes through the LC molecules. When an electric field is applied on the LC in the direction of light, the light oscillation direction maintains unchanged.

This LC property is used to form a regular liquid crystal display (LCD). FIG. 1 is a section view of Prior Art functional LCD panel structure. The first polarizer film 110 converts light from backlight unit 101 to polarized light with its single oscillation direction parallel to polarized direction of the first polarizer film 110. The alignment layer surface is finely grooved and the groove directions of the two plates are in a certain degree. The polarization direction of second polarizer film 111 and first polarizer film 110 is arranged in certain degree so that the polarized light passing through LC 119 changes its oscillation direction to a degree that is perpendicular to the polarization direction of the second polarizer film 111 and be completely blocked. This value of degrees between two polarizer films depends on the LC material used.

For twisted nematic (TN) LC, it is 90 degrees when groove direction of alignment layer 117 and 118 is perpendicular, as an example. Electrode layers 115 and 116 provide electrical field controls that drive LC molecules twisting level so that the strength of light passing through varies from complete through to complete block. With color filter 114, it provides different color and brightness volume on each color cell, thus different colors on each pixel cell, and thus forms a complete image on the screen. A LCD panel 102 is a structure that provides light-switching functionalities controlled by electrical signals on every color cells or pixel cells to form images when light passes through it.

FIG. 2 is a section view of functional Dual Polarizing Filter (DPF) structure, which was disclosed in Provisional U.S. Patent Application 60/558,898, and U.S. patent application Ser. No. 11/092,889, both of which are incorporated herein by reference. It comprises first substrate 123 and second substrate 122 set apart, optional color filter 124, signal control electrode layer 125, first alignment layer 128, LC layer 129, second alignment layer 127 and optional common electrode layer 126 are layered between the two substrates. The detail structure of matrix circuit, transparent pixel electrodes and switchers such as TFT or the like that constructs signal control electrode layer 125 is not shown. The spacer used to maintain the consistent thickness of LC layer 129 and other functional critical layers are not shown either. A Dual Polarizing Filter 103 is a structure that provides light-twisting functionalities controlled by electrical signals on every color cell, which was referenced as a unit in the previous patent applications.

SUMMARY OF THE INVENTION

The invented display device may display 2-D and 3-D images at the same time. 3-D vision is formed when observers wear polarized glasses. 2-D images are not affected whether wearing polarized glasses or not. The display device may display two different 2-D images at the same time as well, one is observed with the naked eye only and the other is observed with polarized glasses only.

To only display one 2-D image, the display takes one regular data stream feeds like a regular display device. The data stream feeds represents the images to be displayed on the screen in the same format that is used for regular 2-D displays.

To display 3-D images or mixed 2-D and 3-D images or multiple 2-D images on the screen, the display takes two data stream feeds. This two data stream feed may be in regular 2-D data format representing stereo image pairs that form stereo 3-D vision or multiple 2-D images, when the display provides internal data signal conversion, by hardware, software, or both. This two data stream feed may also be in a special data format; neither of them may completely represent either 2-D or 3-D images on the screen by itself but two feeds combined together represent both 2-D and 3-D images on the screen when the display does not provide internal data signal conversion. This two special data stream may be generated by separate hardware module or software module or mixed externally from two 2-D image data streams in regular format. The data stream feeds to the display may be in parallel or in serial. In serial data stream mode, the two streams are mixed for delivering and storing. The display separates them internally or separate process device separates them externally. In parallel data stream mode, the two streams are feeds to the display at same time. When data streams are feeds to the display unsynchronized, they are buffered and synchronized by a display internal process or a display external process.

The display comprises two major components. One component, called the main screen, may display regular 2-D images as usual, independently. The other component, which is a DPF, also referenced as the adjusting screen, may display stereo image adjusting data and secondary 2-D image data. Each independently controlled unit on DPF is one-to-one mapped and aligned with a color cell on the main screen. The image data rendered on the DPF is invisible to the naked eye and only visible with special polarized glasses. The image data rendered on the main screen is visible to the naked eye and with polarized glasses.

To display only 2-D images, the single regular 2-D data stream is rendered on the main screen and the display is used as any regular display device. To display 3-D or multiple 2-D images, two regular 2-D data streams are converted into two special data streams, one called the main data stream and the other called the adjusting data stream, and are rendered on main screen and DPF respectively. The two regular 2-D data streams may represent stereo 3-D image pair or represent two different 2-D images. There may not be a display mode switch for displaying 2-D image, 3-D image, 2-D and 3-D mixed image, or multiple 2-D images because primarily the 2-D image is rendered on main screen at all the time, the 3-D image and secondary 2-D image generated by DPF are only visible with polarized glasses.

To observe 3-D vision or secondary 2-D images, observers may need to wear polarized glasses. The polarized glasses for 3-D vision have a perpendicular polarized axis's between the left and right lens. The polarized glasses for secondary 2-D images have the same polarized axis direction on both lenses.

The main screen provides all light energy that reaches the observer's eyes. It may be in polarized form or in regular form. Light passing into the DPF may be polarized. The DPF twists the polarization direction of the light passing through it a certain degree so only part of the light is filtered through each lens. When using 3-D polarized glasses, the polarization direction twisting in the DPF provides the light energy dividing for left and right eyes. When using 2-D polarized glasses, the polarization direction twisting in the DPF provides the light energy filtering for both eyes. The polarization direction twisting in the DPF does not affect the light energy reaching the naked eye.

To display 3-D images or 2-D and 3-D mixed images, the main screen is controlled to provide total light energy for both left and right images on each pixel and further on each color cell. The main screen and its corresponding control mechanism may also be referred to as the light volume controller. The DPF may be controlled to divide the total light energy between two polarized glasses lens for the left and right images on each pixel and further for each color cell. By controlling polarization direction twisting degree when polarized light passes through each independently controlled unit of the DPF, the 3-D polarized glasses, with its two lens axis in perpendicular, filters the light in a mutually exclusive manner. Thus if the light completely passes through one polarized lens, it may be completely blocked by the other polarized lens at the same time, and vice-versa.

When the DPF is controlled to evenly divide light energy towards both lenses on any color cells and further on any pixels, both eyes behind the lens observe the same color and brightness on the same pixel cells, in further, both eyes observe the same image formed by these pixels, which provides 2-D vision. When the DPF is controlled not to evenly divide light energy towards both lenses on every color cell and further on every pixel, both eyes behind the lens observes different color and brightness on the same pixel cells, in further, both eyes observes different images formed by these pixels, which provides 3-D vision when the left and right eye observed image is a stereo image pair. Without 3-D polarized glasses, the 2-D image is observed clearly since both the naked eye observes same light energy on the pixels regardless of polarization direction, and the 3-D image is blurred.

To display pure 2-D images and use the display as a regular 2-D display without wearing polarized glasses, the DPF may not be activated. Thus, any or no control signals are applied on the DPF. It also means only one data stream feed is required.

To display two 2-D images on the screen at the same time, the main image to be observed with the naked eye and secondary image to be observed with 2-D polarized glasses, which have same polarization axis for both lens, the main screen is controlled to display the main image and the DPF is controlled to make up secondary image from the light energy on each color cell that forms the main image on the main screen. By controlling the polarization direction twisting degree of polarized light passing through each unit on the DPF, we may adjust the light energy observed through the secondary image polarized glasses, which has both lens polarization axis in parallel. These adjusted light energy observed on each color cell forms different color and brightness for the same pixel on the screen with polarized lens and without polarized lens. In further, these different color and brightness observed through polarized glasses forms a secondary image different than the main image. Although the secondary image quality is affected by the main image rendered on the main screen, for example a pixel cell is very dark for the main image may cause not enough light energy available on this pixel cell to be adjusted on the DPF for the secondary image color at this pixel cell, it may be improved in certain degree by utilizing light energy from the surrounding pixel cells and color mixing theory to make up the color required for the secondary image as close as possible. For good secondary image quality, it requires the main image brightness be higher than the secondary image and the color pureness of the secondary image is higher than the main image in general.

This new method and apparatus for image constructing utilize multi-level light controlling technology may be applied to different existing display technologies such as LCD, PDP, LED, CRT and OLED, or the like. These types display devices may all be used as main screen in the display device of the present invention. If the main screen emits polarized light, the DPF may be attached to the main screen, aligned pixel to pixel. When the proper main data stream and adjusting data stream is applied on the main screen and the DPF respectively, observers see both 2-D and 3-D or multiple 2-D images on the screen at the same time. If the main screen does not emit polarized light, a polarized film may be attached to the main screen and then the DPF attached thereto. The main data stream and the adjusting data stream remains unchanged in this case.

To form stereo 3-D vision, an observer's left and right eye need see slightly different image on the screen. That means each pixel cell on the screen must display the image pixel of the left image and of the right image at same time so the displayed 3-D image has the maximum resolution or image quality that display screen physical cell resolution may support.

Human eyes recognize an image pixel by its color and brightness. Color is represented and constructed by a set of light volumes of a given primary color set. Different combination of the light volume of each primary color defines different color and the summery of light volume of every primary color defines the brightness. To construct any color in certain brightness is actually to control the light volume of each components of a selected primary color set. To construct a stereo 3-D image is actually to independently control the light volume, or strength, that reach left and right eye.

Using two level light controllers may accomplish this task. The first level controller controls the total light volume that reaches both eyes. The second level controller controls the percentage of this amount light between left and right eye.

The first level controller's control ratio Rm is from zero (0) to one (1). When Rm equals 0, the first level controller is completely closed, no light comes out of the first level controller; When Rm equals 1, the first level controller is maximum opened, so maximum amount of light M comes out of the first level controller.

The second level controller's control ratio Ra is also from zero (0) to one (1). When Ra equals 0, the second level controller passes 100% light out of the first level controller towards the first eye and 0% light towards the second eye; When Ra equals 1, the second level controller passes 0% light out of the first level controller towards the first eye and 100% light towards the second eye.

Assume E1 is the normalized light volume of one primary color component of a pixel belong to an image meant to be observed by the first eye, and E2 is the normalized light volume of the same primary color component of a pixel belong to another image, at the same position, meant to be observed by the other eye, then we have the equations:

$Rm=(E1+E2)/2$ and $Ra=E2/(E1+E2)$.

Where E1 and E2 both has its volume range between zero (0) to one (1).

Accordingly, the equations:

$Rm=(E1+E2)/2$ and $Ra=E1/(E1+E2)$ represent the controlling scenario of when Ra equals 0, the second level controller passes 100% light out of the first level controller towards the second eye and 0% light towards the first eye; and when Ra equals 1, the second level controller passes 0% light out of the first level controller towards the second eye and 100% light towards the first eye.

For digitalized images, images are represented by pixels and each pixel is represented by a set of color-component-values of a selected primary color set. A color-component-value has value range from zero (0) to one (1). For instance, chosen primary color set as red (r), green (g), and blue (b). A pixel p1 at position P(x, y) of first image A1 is represented as [r1, g1, b1] and a pixel p2 at the same position P(x, y) of second image A2 is represented as [r2, g2, b2]. Here x and y the coordinator value in a given coordinator system, and r1, g1, b1, r2, g2, b2 are the color-component-value of red, green, and blue accordingly that constructs the pixel color of p1 and p2 at position P of image A1 and A2 respectively. To have different eye observes p1 and p2 independently and separately, the light control ratio Rm on the pixel cell of the first level controller that represents image position P(x, y) and the light control ratio Ra on the pixel cell of the second level controller that represents the same image position P can be calculated using color-component-values of p1 and p2, and further more, this same calculation can be applied on each color-component-value of the selected primary color set independently, which is [(r1+r2)/2, (g1+g2)/2, (b1+b2)/2] and [r2/(r1+r2), g2/(g1+g2), b2/(b1+b2)] respectively. Under this control, these separately observed pixels forms separate and independent images for different eyes. When the two images is a stereo image pair, they form stereo 3-D vision for observers.

Since the second level light control divides the total light volume between two eyes, when form the same image to both eyes, the light amount reaches each eye is actually less than the light amount that reaches each eye without this special light control. To have both eye accepts the same light volume of regular displayed image A1 or A2 under this special light control method and apparatus, the maximum light volume emits out of the first level controller is adjusted to be 2M. However, because of this new light control method and apparatus is meant to form image A1 and A2 separately to different eyes, the maximum light volume emits out of the first level controller may be remained to the same M.

The control data for the first level and the second level controlling can be constructed through the original first and second image data stream. If pixel data in the original first data stream is arranged as a sequence of R, G, B values D1, and pixel data in the original second data stream is arranged as a sequence of R, G, B values D2, the new control data stream is constructed in the same form of the original data stream. The control data in the new constructed data streams are a sequence of value C1 and C2 that map to each R, G, B values in the original data streams. Where $C1=(D1+D2)/2$ and $C2=T*D2/(D1+D2)$, in which T is the maximum value of original image data. For digitalized data, it is defined by the bit-length of D1 and D2. Value C2 can also be constructed as $T*D1/(D1+D2)$ that controls the second control level to divide light alternatively. The control data C1 and C2 forms control data streams when they are constructed from data D1 and D2 of the first and the second image data streams. The stream control data C1 and C2 are applied to the main screen as the first level light control and the DPF as the second level light control respectively, like image data stream rendering on the main screen or DPF accordingly. For example, if one RGB value D1 in the first data stream is 10, which is 00001010 in binary, and one corresponding RGB value D2 in the second data stream is 34, which is 00100010 in binary, then the new constructed data value C1 in the first level light control data stream applied on the main screen is (10+34)/2=22 and the new constructed data value C2 in the second level light control data stream applied on the DPF is 255*10/(10+34) =57.955, or approximately 58, where 255 is the maximum value represented in 8 bits.

The control data values, C1 or C2 can be pre-constructed digitally and saved in a block of memory. Each element of this block of memory can be uniquely addressed by image data D1 and D2 combination. To construct the address of this block of memory, D1 and D2 can be catenated into one, where D1 is higher bits and D2 is lower bits, or vice-versa. The memory element addressed or indexed by "D1D2" or "D2D1" stores the value C1 or C2. Value C1 and C2 can also contains other adjusting value parts besides of the constructed from D1 and D2 so that they can control and drive the first and the second light control level more accurately. Since twisting reaction of liquid crystal and applied voltage is not in perfect linear, the linear correction value B can be accompanied into the row control value C, which value B is a function of raw control value C. The combined final control value C can be stored in the proper memory element that can be addressed through D1 and D2.

For example, a pre-calculated C1 value 22 from D1 of value 10 and D2 of value 34 can be saved on a memory element of first memory block, the element address or offset related to the memory block beginning address can be constructed as "0000101000100010", where the higher 8 bits is the D1 value in binary and lower 8 bits is the D2 value in binary, which is element 2594 in order. The pre-calculated C2 value 58 from the same value D1 and D2 can be saved on a memory element of second memory block, and the element address or offset related to the second memory block beginning address is the same 2594. If the linear correction value B is −1 for C1=22, then the element 2594 of the first memory block holds the combined value 21, which is 22+(−1).

Here the memory element can holds a data value of any given bit length for accuracy. Value B can also be stored in separate memory block that is addressed in the same method, so the value B can be located in the same way that locates raw control value. The value B fetched out then can be add to the raw control value, which can be fetch out from the memory block or calculated dynamically, at run time as final control value. For example the B value (−1) can be saved in a third memory block at the element 22. Thus for the given image data 10 and 34, the stored value 22 is allocated at element 2594 of the first memory block and the stored value (−1) is allocated at element 22 of the third memory block, and the final control data value is the summary of 22 and (−1).

The control data stream construction can be performed by software or hardware or their combination. When performed by software, the original image data may be buffered in memory, data is processed, and the result is written back to memory before they are swapped to a display device. The control data is feed to a display device like regular image data stream and control data C1 is rendered on the main screen and control data C2 is rendered on the DPF. When performed by hardware, which can be an external device or an internal chip and circuit combination as part of display device, the original two image data streams can be directly feed into the hardware and the hardware constructs control data streams that renders to main screen and DPF.

The data stream, either control data stream or image data stream, feed into display device can be in parallel through different port. They should be in sync; otherwise, synchronization should be handled in software or in hardware by proper buffering. The data streams can also be parallel through the same port by mixing them on different frequencies or share the same frequency at different time. When they are mixed on different frequency, the distance of two frequencies can be predefined. A display device capable to display dual polarized 3-D images can accept both feeds simultaneously. When it locks on one frequency, it can lock its corresponding frequency based on predefined distance. A display device only capable to display regular 2-D images will lock these two frequencies separately and displays these two data streams separately without interfere each other. When they are mixed on same frequency at different time, the mixed data streams are separated and buffered into different memory buffer before they are processed or rendered to different screens. When the data streams are mixed on different time-sharing, they are buffered to sync for dual polarizing display.

Any regular display device may be used as the first level controller. A dual polarizing filter described in Provisional U.S. Patent Application Ser. No. 60/558,898 may be used as the second level controller. However, the implementation of the first level controller and the second level controller are not limited to a regular display and a Dual Polarizing Filter.

The presented invention provides a new method and apparatus for construct images on display screen for both 2-D and stereo 3-D. The image quality is very high and color rich. Displayed image may have the highest resolution that display screen physical resolution may support. The manufacture process is simple and cost effective. It natively supports all existing data format used for images and videos.

The invented display method and apparatus may provide full resolution 3-D image while observer wears 3-D polarized glasses and full resolution 2-D image at same time. The 2-D image displayed on screen may be the same no matter observer wears polarized glasses or not.

This new method and apparatus for constructing 2-D and 3-D image may be applied on any display device that illuminates light itself, either regular natural light or polarizing light.

The invented display method and apparatus may also provide two different 2-D images at same time in full physical resolution, one may be only observed with the naked eye and the other may be only observed with 2-D polarized glasses, which is different with 3-D polarized glasses.

The invented display method also provides a new way to construct 3-D projector. To LCD based projector, inserting a DPF between the LCD panel and zooming optical system, and apply the control data signal stream disclosed in the invention, constructs a projector that shuts out both 2-D image and 3-D image on projector screen. The 3-D image reflected back from the screen can be observed through polarized glasses and form 3-D vision. When each color subcomponents on the LCD panel are mapped and aligned with each control unit on dual-polarize filter accordingly, apply control signal C1 and C2 generates emitted lights that is mixed with two polarized light with their polarize direction perpendicular. Different images may be represented by light having different polarization directions. For a DLP based projector, inserting a DPF with a polarize film attached at one side that facing the DLP chip between the DLP chip and zooming optical system, and apply the control data signal stream disclosed in the invention, constructs a projector that shuts out both 2-D image and 3-D image as well. The light reflected by micro-mirrors becomes polarized light and the light further becomes a mixing of two polarized light with their polarize direction perpendicular when pass through the dual-polarize filter.

BRIEF DESCRIPTION OF THE DRAWINGS

FIG. 9 is a functional diagram of dual control signal converter 900, which may be a part of display, or an independent hardware adaptor, or a component unit builds into other devices, such as computer video card or TV signal station, or the like.

DETAILED DESCRIPTION OF THE INVENTION

Figure 3:
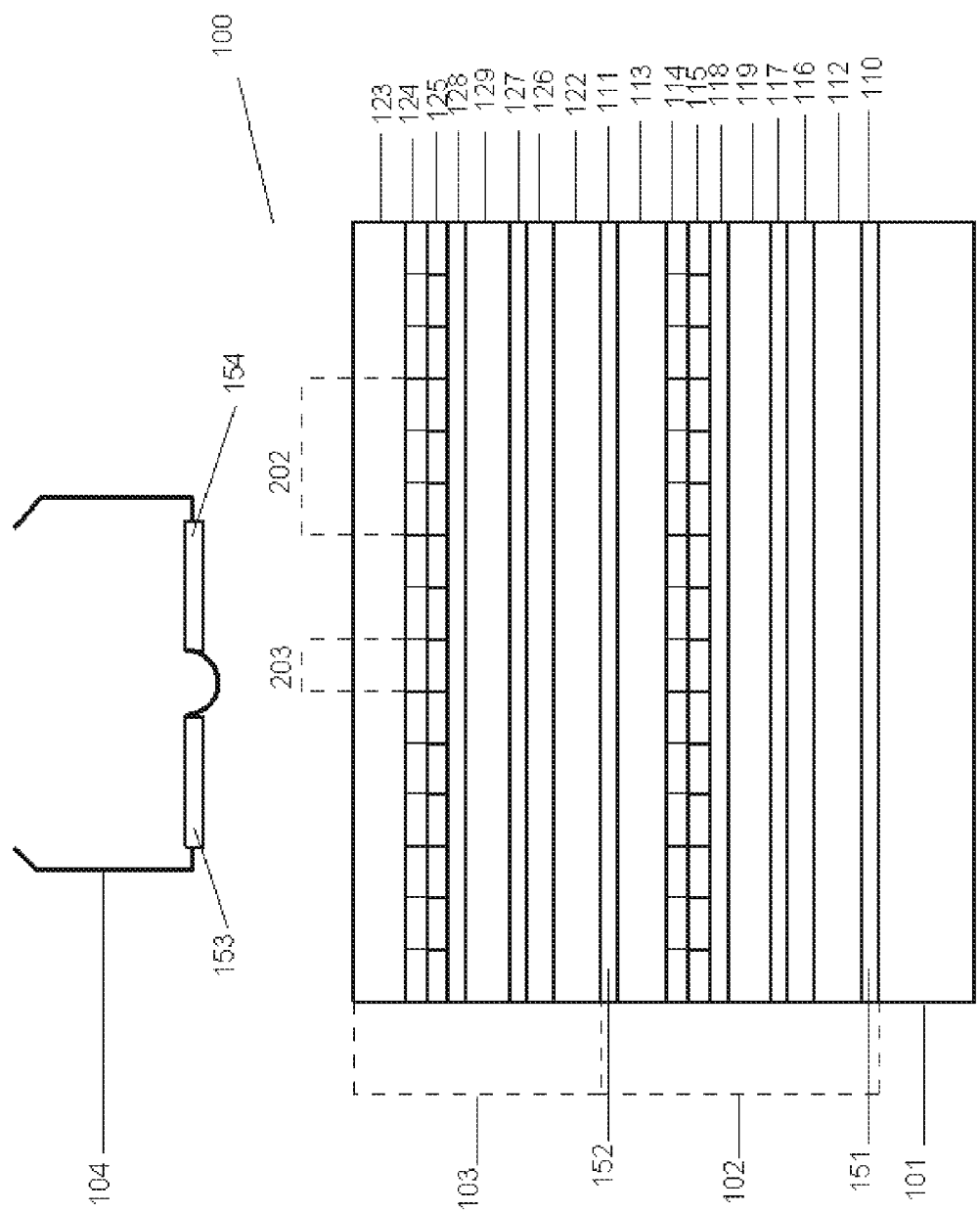
FIG. 3 is a functional structure section view of an LCD based display embodiment.

FIG. 3 is a functional structure section view of an LCD based display embodiment 100. The apparatus comprises backlight 101, LCD panel 102, Dual Polarizing Filter 103, and 3-D polarized glasses 104. LCD panel 102 and Dual Polarizing Filter 103 may be arranged pixel-to-pixel, and further its color cells as well, are aligned in row and column. Pixel cell 202 comprises at least one color cell 203. Color filter 124 may be omitted. However, if both color filter 114 and 124 are used, the same primary color set and color cell size and arrangement pattern may also be the same between 114 and 124. The corresponding signal control electrode layer 115 and 125 may also have the same color cell size and arrangement accordingly. In other words, no matter how many color cells are grouped as a pixel, and how these color cells are arranged to make up a pixel, each corresponding color cell on 102 and 103 may be aligned in row and column on the same colors.

Image control electrode layers 115 and 125 provide each color cell control using transparent electrodes, matrix circuits and TFT switches or other control circuits (not shown). Common electrode layer 116 and 126 may be omitted when a certain type of electrical circuit is formed on image control electrode layers 115 or 125. Color filter layer 114 or 124 may be located differently, for example it may be next to either substrate. If both color filter 114 and 124 are omitted, the display becomes monochrome.

First polarized film polarization axis 151 and second polarized film polarization axis 152 is arranged in a way that when voltage applied on LC material layer 119 of any color cell on LCD panel 102 changes from amount V0 to amount V1, the volume of the light pass through, which is from backlight unit 101, on this color cell is changed from maximum, which is completely passed through, to minimum, which is completely blocked, or vice-versa.

The first lens polarized axis 153 and the second lens polarized axis 154 of 3-D polarized glasses 104 are arranged in the way that for any color cell of Dual Polarizing Filter 103, when voltage applied on LC material layer 129 changes from volume U0 to volume U1, the volume of light emitted out and passed through the first lens changes from the maximum to the minimum. Meanwhile the volume of light that emitted out and passed through the second lens changes from the minimum to the maximum accordingly, or vice-versa. For any color cell at any given time point, the maximum light volume passes through lens is the total light volume emitted out from LCD panel 102; the minimum light volume is zero, which means the polarized lens completely blocks the light out of LCD panel 102. From any color cell on the display, the volume of light passed through the first lens and the second lens are always in complement and the sum of them is equal to the light volume emitted from the LCD panel 102 at any time point.

Thus, by controlling voltage applied on LC layer 119, we may control the light amount out of each color cell of any pixel on LCD panel 102 at any time. By controlling voltage applied on LC layer 129, we may divide light volume emitted out of any color cell on LCD panel 102 at any given time point between the two polarized glasses lens, so part of the light pass through one lens and the rest pass through the other lens. This makes observer's left eye and right eye observes different light strength on the same color cell of the display screen at the same time. So left and right eyes may observe different color and brightness on the same pixel cell of the display screen at the same time. As result left and right eyes observe different images independently on the same display screen at the same time.

To display 2-D image on the screen, each color cell on LCD panel 102 is controlled to pass proper volume of light from backlight unit to form the color and brightness of the pixel that the color cell belongs to, which forms the 2-D image on LCD panel 102. Correspondingly, each color cell on Dual Polarizing Filter 103 is controlled to divide light emitted from each corresponding color cell evenly pass through the two lens of polarized glasses 104. Thus, when observer wears 3-D polarized glasses 104, both eyes observers same amount of light on the same color cell and further the same color on same pixel cell on the screen. So both eyes observe same image constructed by those pixels on the screen, which forms 2-D vision. When observer does not wear 3-D polarized glasses 104, since the light polarization direction altered by Dual Polarizing Filter 103 does not affect the naked eye so both eyes always observe all light volume emitted from LCD panel 102 on same color cell, and further the same color and brightness on the same screen pixel cell, which forms 2-D image in the same way of regular display screen.

To display 3-D image or 3-D and 2-D mixed image on the screen, the 2-D image portion display may be the same as described above. For the 3-D image portion, each color cell on LCD panel 102 is controlled to pass the total light volume that is required to construct proper color for the corresponding pixels of left and right images. Each aligned color cell on Dual Polarizing Filter 103 is controlled to properly divide this total amount of light emitted out of each corresponding color cell of LCD panel 102 to pass through the left polarized lens and the right polarized lens so that different color is observed through different lens for the same pixel cell on the screen. These different colors observed through different lens forms different images to left and right eyes. When the images observed independently by two eyes are stereo image pairs, it forms stereo 3-D vision. When observer does not wear glasses, the 3-D image portion is blurred because light emitted out of color cells on LCD panel 102 does not form image properly at 3-D image portions. But 2-D image portions do not affected.

Figure 4:
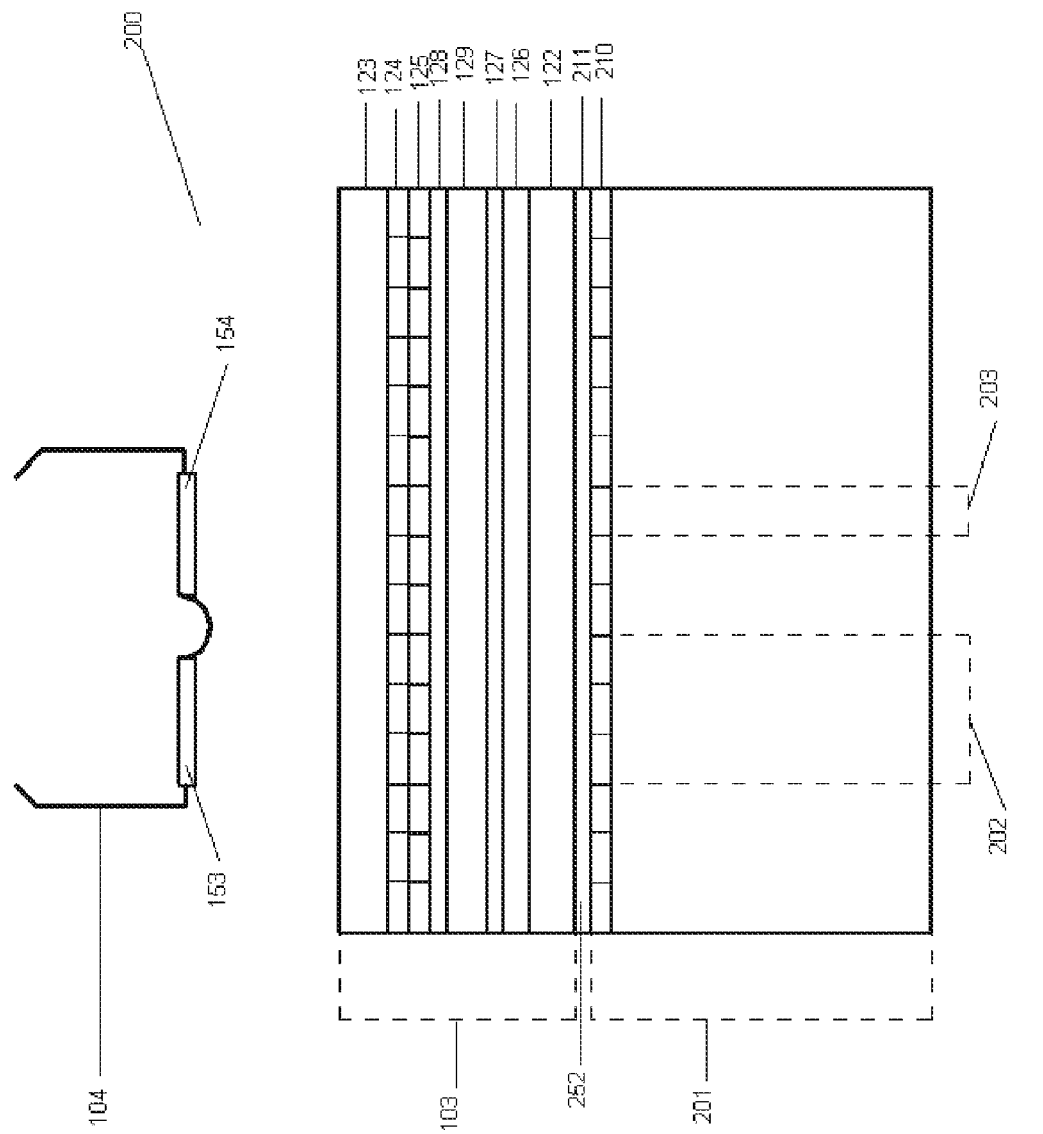
FIG. 4 is a functional structure cross-section view of one embodiment of the present invention based on any display device that emits regular light.

FIG. 4 is a functional structure cross-section view of an embodiment 200 of the present invention based on any display device that emits regular light. The system comprises the regular 2-D display 201, the polarized film 211, the Dual Polarizing Filter 103, and the polarized glasses 104. The regular 2-D display 201 has a display screen 210 that is comprised with pixels 202 in certain pattern and each pixel is arranged with sub cells call color cell 203 in certain sub cell pattern. Each color cell 203 represents one primary color of selected primary color set for the pixel cell color construction. These color cells on screen 210 may be independently controlled to construct proper color and brightness for the pixel they belong to and further construct image on the screen 210. Polarized film 211 converts light emitted out of display screen 210 to be polarized light of direction 252. Dual Polarizing Filter 103 has the same layer structure as the one in embodiment 100. Pixels on Dual Polarizing Filter 103 and further the color cells have the same size and the same shape and arranged in the same pattern as the pixels and color cells on display screen 210. They are aligned in row and column and mapped one to one, so the color cells in each pixel as well.

The first lens polarized axis 153 and the second lens polarized axis 154 of 3-D polarized glasses 104 are arranged in the way that for any color cell of Dual Polarizing Filter 103, when voltage applied on LC material layer 129 changes from volume U0 to volume U1, the volume of light emitted out and passed through the first lens changes from the maximum to the minimum. Meanwhile the volume of light that emitted out and passed through the second lens changes from the minimum to the maximum accordingly, or vice-versa. For any color cell at any given time point, the maximum light volume passes through lens is the total light volume emitted out from display screen 210 and polarized film 252; the minimum light volume is zero, which means the polarized lens completely blocks the light out of screen 210 and polarized film 252. From any color cell on the display, the volume of light passed through the first lens and the second lens are always in complement and the sum of them is equal to the light volume emitted from the screen 210 and polarized film 252 at any time point.

To display 2-D images, regular display 201 renders the image under regular control mode while Dual Polarizing Filter 103 is controlled to divide light emitted from each color cell evenly to both lens of polarized glasses 104. So both eyes observe same light volume on the same color cell on the screen and further same color and brightness on the same pixel on the screen no matter observers wearing polarized glasses or not.

To display 3-D images, display component 201 is controlled to emit light volume in the amount of the sum of the light volume that is required for left and right images on each color cells. Dual Polarizing Filter 103 is controlled to divide light emitted out of each color cells on display component screen 210 to left and right lens so that proper amount of light emitted on each color cells is observed through left and right polarized lens. Observers left and right eyes see different color and brightness on the pixels of display component screen 210 through 3-D polarized glasses 104. These different color and brightness pixels observed through polarized glasses lens 153 and 154 forms different images to left eye and right eye, which is the left and right image of a stereo image pair, and forms stereo 3-D vision for the observers.

Figure 5:
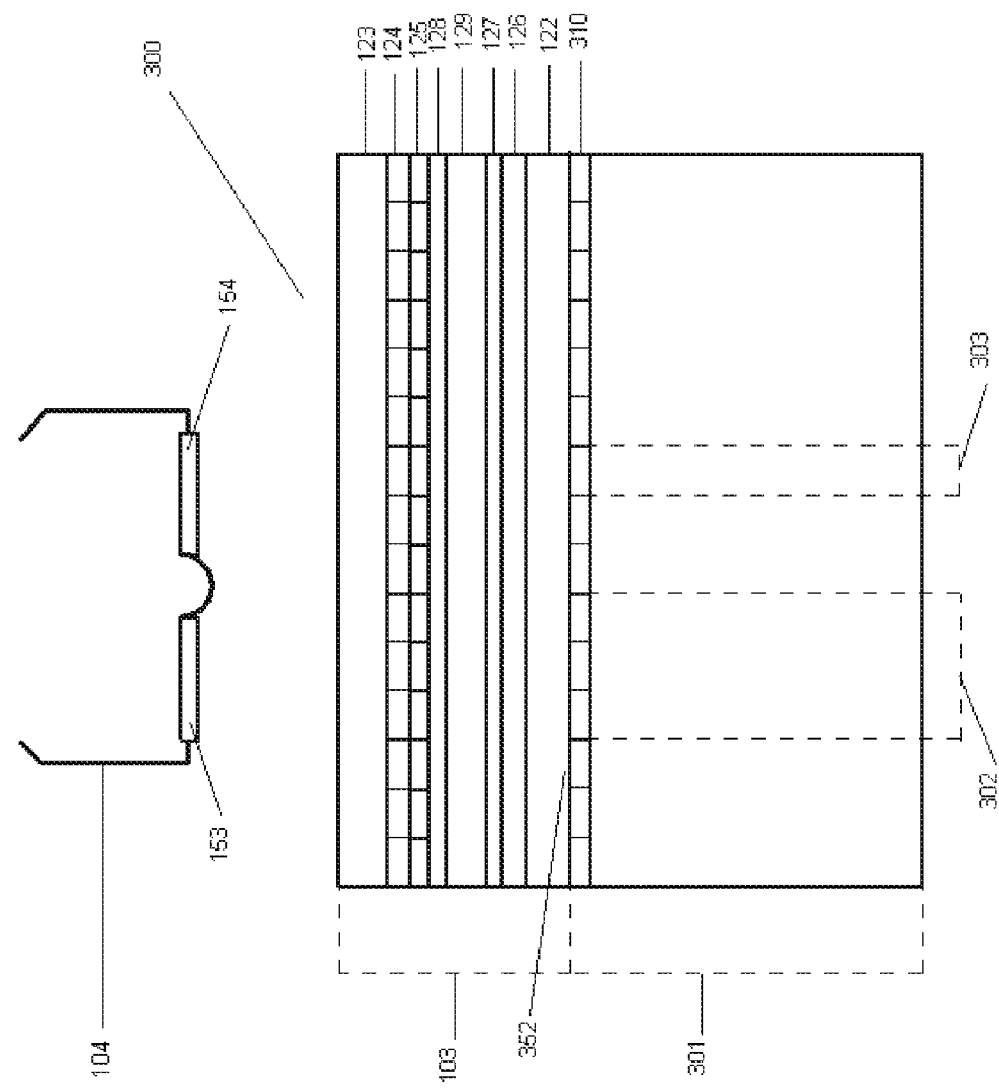
FIG. 5 is a functional structure cross-section view of another embodiment of the present invention using polarized light.

If display device that emits polarized light itself, the polarized film between display screen 201 and Dual Polarizing Filter 103 may be omitted. FIG. 5 is a functional structure cross-section view of an embodiment 300 based on any display device that emits polarized light. 302 and 303 are pixel and color cell of the display respectively, which is equivalent to 202 and 203 in FIG. 4 respectively. The pixel cells and its color cells of screen 210 and Dual Polarizing Filter 103 are in same size and shape and aligned in row and column. The direction of polarized light emitted out of screen 310 is 352. The polarized film 211 in FIG. 4 converts the regular light passes through it to be polarized light of direction 252, which is equivalent in functionality to the polarized light of direction 352 in FIG. 5. Polarized light is emitted directly from screen 310. Thus the controlling applied on Dual Polarizing Filter 103 in FIG. 5 is the same to the controlling applied on Dual Polarizing Filter 103 in FIG. 4. The data signals feed to display component 301 and to display component 201 are also the same for both 2-D and 3-D displaying.

Figure 1:
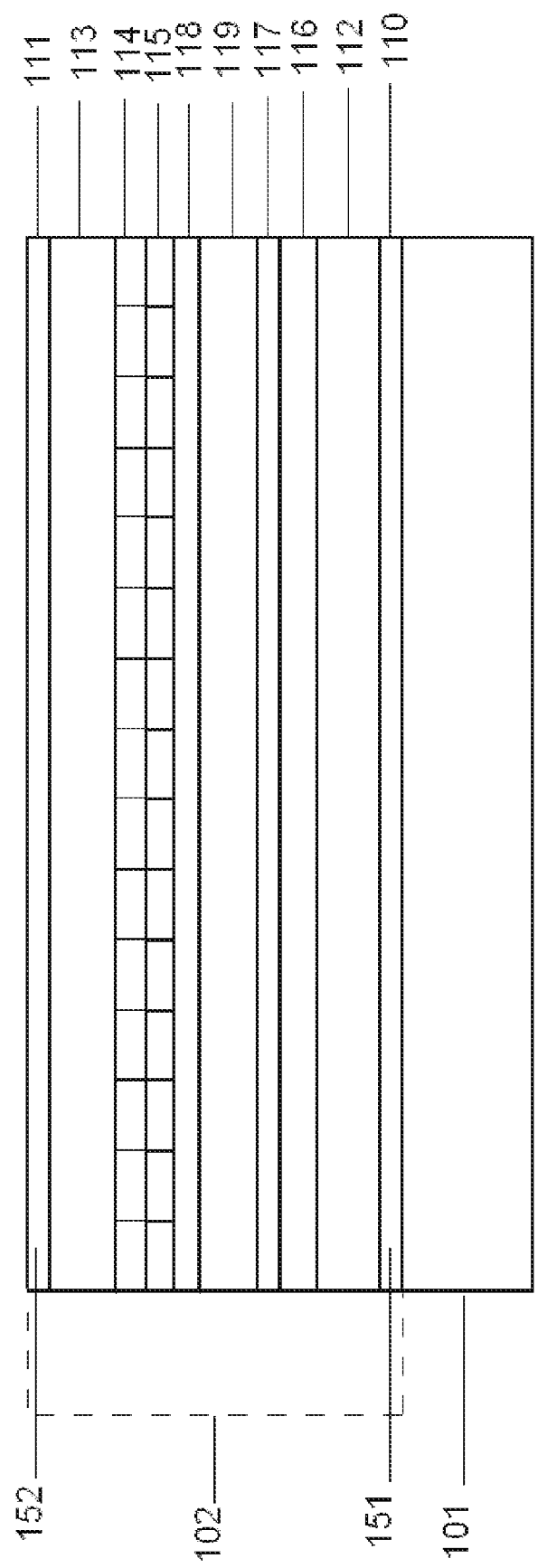
FIG. 1 is a section view of a Prior Art functional LCD panel structure.
Figure 2:
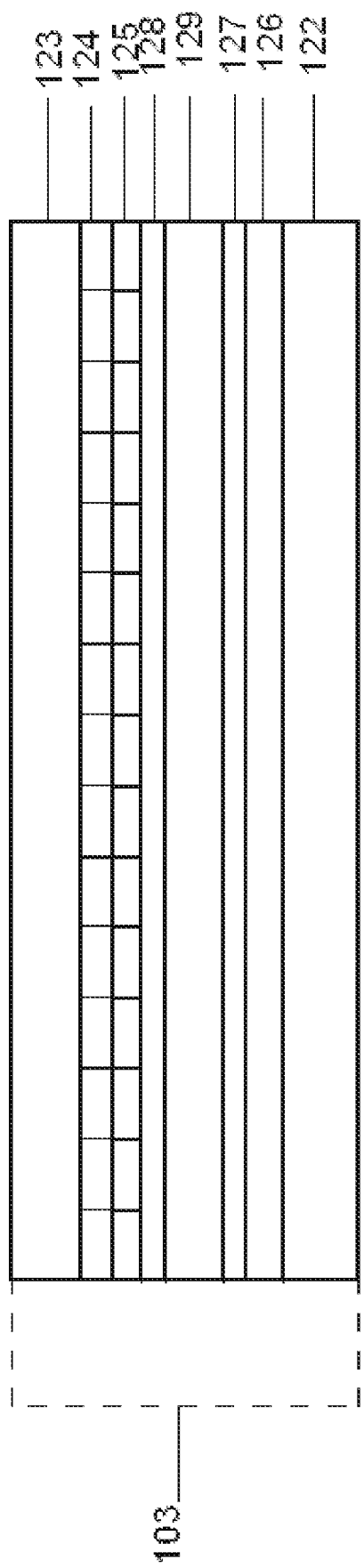
FIG. 2 is a section view of functional Dual Polarizing Filter structure, which was disclosed as in the applicant's previous patent application 60/558,898.
Figure 6:
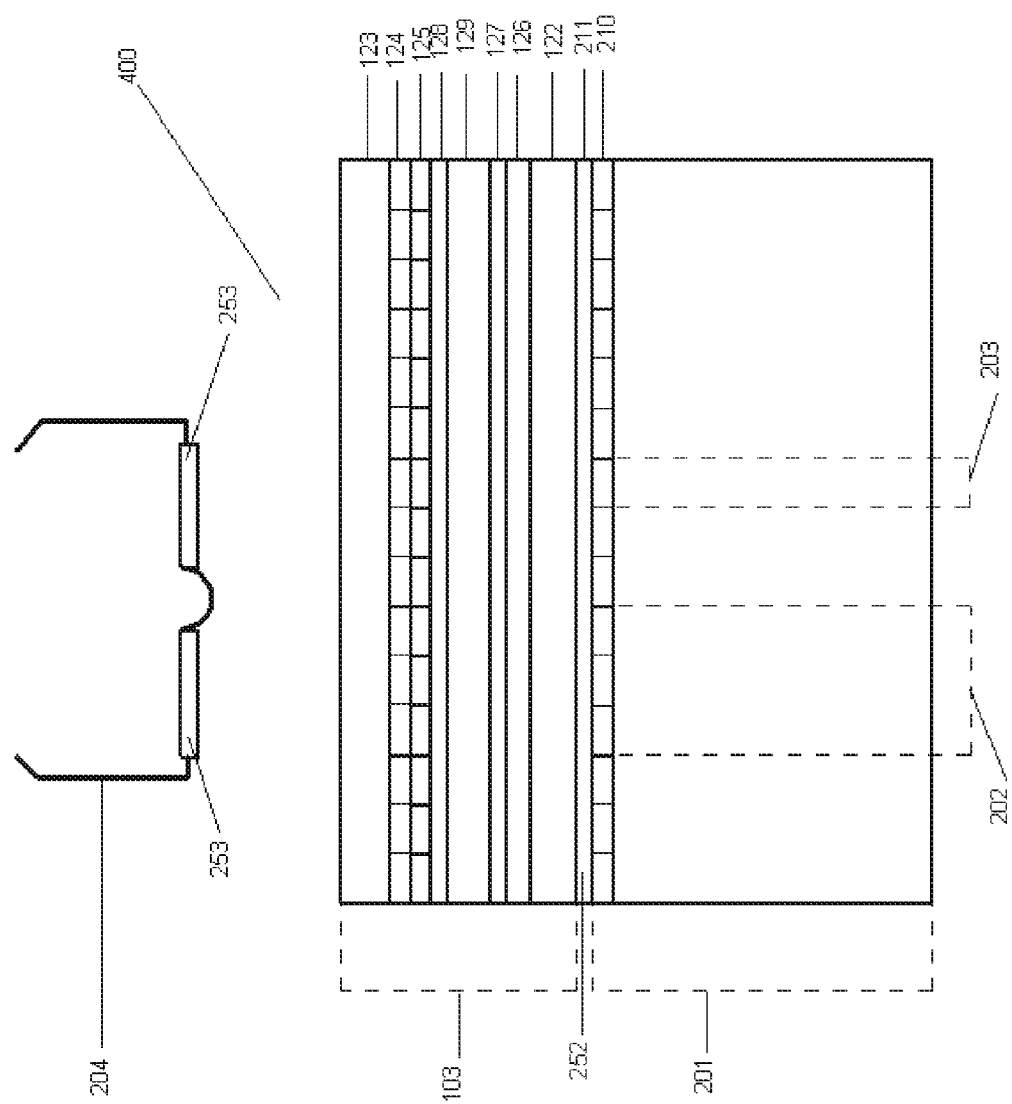
FIG. 6 is another embodiment of the light control method and apparatus for the present invention.

FIG. 6 is another embodiment of presented light control method and apparatus. The display device 400 displays one image for observers wearing 2-D polarized glasses and displays different image for observers don't wear polarized glasses. The system comprises a 3-D display embodiment disclosed in FIG. 3, FIG. 4, or in FIG. 5, and 2-D polarizing glasses 204.

There is one difference between 3-D polarizing glasses and 2-D polarizing glasses. The polarization axis of the two lens of 3-D polarizing glasses 104 are in perpendicular to each other. 2-D polarized glasses 204 have two polarized lens with the same polarization axis direction 253. For given polarized film polarization axis 252 or given polarized light of direction 252 that emitted out of screen 210, polarized glasses lens polarization axis 253 is arranged in the way that for any color cell on Dual Polarizing Filter 103, when control voltage applied on LC material layer 129 changes from volume U0 to volume U1, the volume of light emitted out and passed through both lens changes from the maximum to the minimum, or vice verse. For any color cell at any given time point, the maximum light volume passes through both lens is the total light volume emitted out from display screen 210 and optional polarized film 252, which is omitted if screen 210 emits polarized light; the minimum light volume is zero, which means both polarized lens completely blocks the light emitted out from screen 210 and optional polarized film 252.

The 2-D images observed without polarized glasses are rendered on display screen 210. The color cells on screen 210 are controlled to deliver proper amount of light and thus every pixels displays proper color and brightness that forms the image meant to be displayed and viewed with the naked eye. The secondary images that are invisible to the naked eye are meant to be observed by wearing 2-D polarized glasses 204. The color values of every pixel of the secondary image is compared to the color value of the pixels on screen 210 at the corresponding position to decide the control voltage applied on each color cell on Dual Polarizing Filter 103 so that the pixel color and brightness observed through the polarized glasses 204 is visually as accurate as possible compare to the pixel color and brightness of the secondary image.

Figure 7:
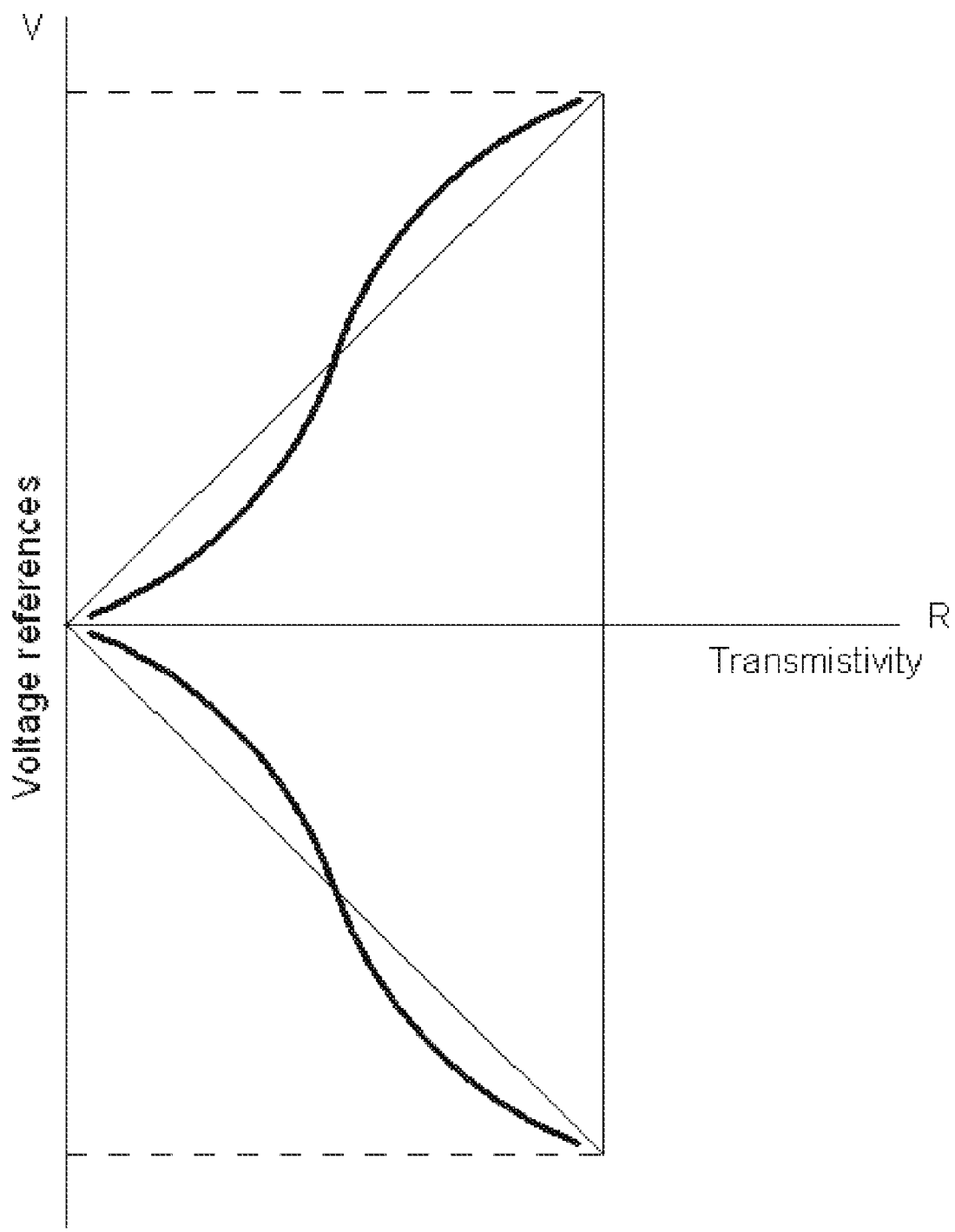
FIG. 7 is a typical reaction curve between applied voltage and light strength passed through an LCD panel 102 in FIG. 3.

The control signals, such as electrical voltages, applied to color cells are not necessary to be linear to the light amount or strength delivered through the color cells. For example, the relation of voltage applied on LC material and the twisting status, which is used to control light through put, is an "S" curve that may be very close to a straight line. FIG. 7 is a typical reaction curve between applied voltage and light strength passed through an LCD panel 102 in FIG. 3. When this reaction curve is approximate to a straight line or is treated as a straight line, the control equation $Rm=(E1+E2)/2$ and Ra=E2/(E1+E2) is approximate to Vm=(v1+v2)/2 and Va=v2/(v1+v2). Accordingly, Rm=(E1+E2)/2 and Ra=E1/(E1+E2) is approximate to Vm=(v1+v2)/2 and Va=v1/(v1+v2). Where Vm and Va is the voltage value applied on the main screen and adjust screen respectively on corresponding aligned color cells. v1 and v2 is the voltage value should be applied on the color cell of a main screen to construct the 2-D left and right images respectively if we want observe them with the naked eye. In general, Rm=Fm (Vm) and Ra=Fa(Va), where Fm is the reaction function for the main screen between control signal Vm and light strength Rm, such as component 102 in FIG. 3, component 201 in FIG. 4 and component 301 in FIG. 5. Fa is the reaction function for Dual Polarizing Film 103 between control signal Va and light strength Ra that passed through one lens of 3-D polarized glasses 104.

Figure 8:
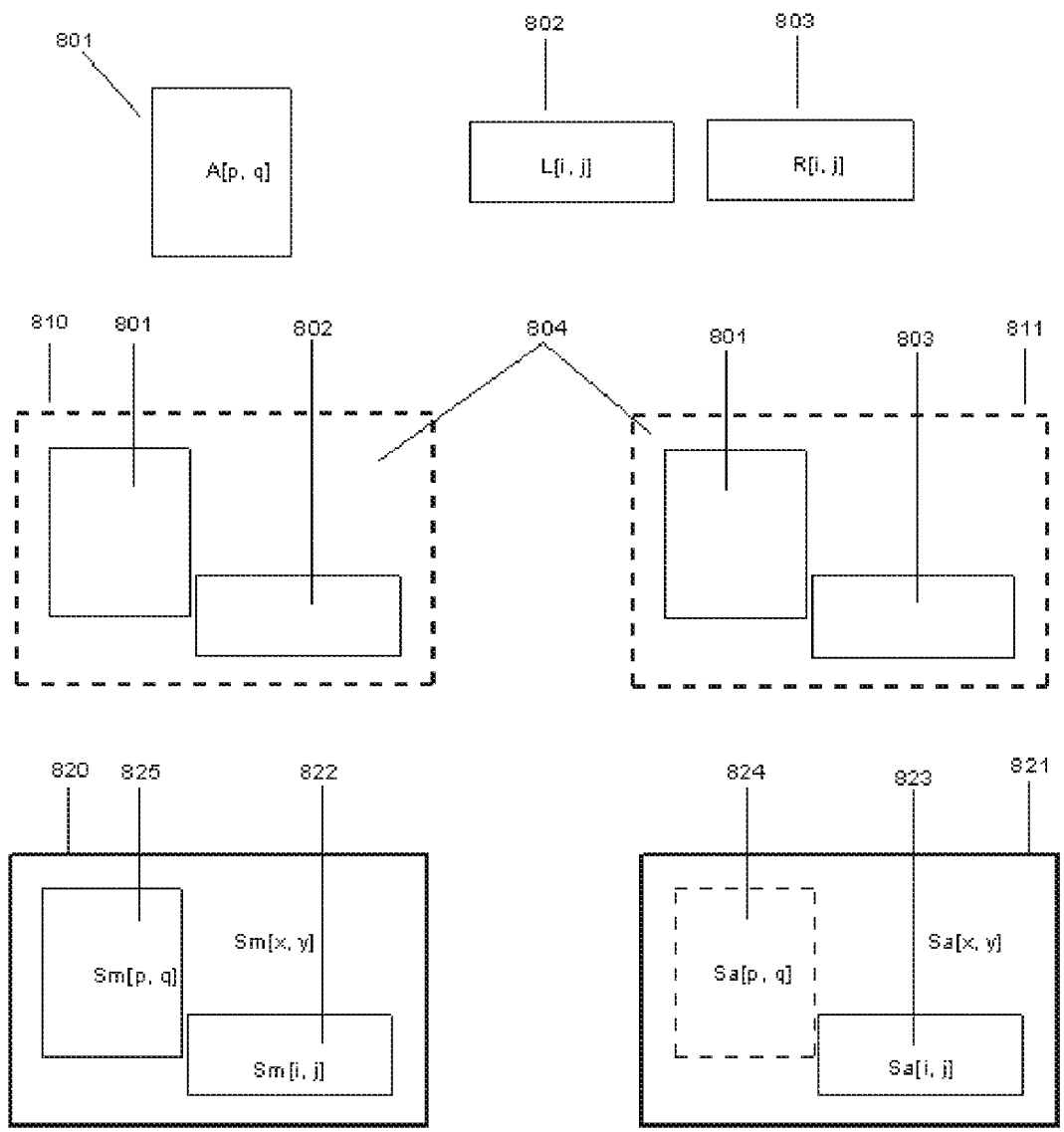
FIG. 8 is a data process diagram of generating data streams for main screen and DPF to construct both 2-D and 3-D images at the same time.

Furthermore, when assume the reaction function between image signal values and voltage volumes applied on screen color cells are linear, the data signal stream feeds to the main screen Sm=(s1+s2)/2 and the data signal stream feeds to the DPF Sa=T*s2/(s1+s2) or Sa=T*s1/(s1+s2). Here s1 and s2 is the data signal stream for 2-D left and right images. T is the maximum signal value of s1 and s2. This formula provides a signal processing method and apparatus to prepare stereo 3-D data stream. FIG. 8 is a data process diagram of generating data streams for main screen and adjusting screen to construct both 2-D and 3-D images at the same time.

A 2-D image of Q row by P column pixels 801 is represented as a data matrix of Q row by P column A[p, q], where each element in data matrix and pixel in image is one-to-one mapped. A stereo pair of 3-D image 802 and 803 of J row by I column, where 802 is its left image and 803 is its right image, is represented as data matrix of J row by I column L[i, j] and R[i, j] respectively. Each element in data matrix L and R is one-to-one mapped with pixel in left image 802 and right image 803 correspondingly. To form 3-D vision, 802 and 803 must be overlapped and aligned on each coordinate point [i, j].

The observer's viewing space 804 is the physical display screen space observer looks at, which is comprised with Y row by X column pixel cells. Observer's left and right eye observes logic display screen space 810 and 811 respectively. To form both 2-D and 3-D vision on the same display screen, 2-D image 801 is displayed on logic left screen 810 and right screen 811 at the same location, and left stereo image 802 is displayed on logic left screen 810 and right stereo image 803 is displayed on logic right screen 811. Logic left screen 810 and logic right screen 811 is left and right eye observed physical display screen 804 accordingly.

820 and 821 are the data buffers, which is represented and organized as data matrix Sm[x, y] and Sa[x, y], that maps to the main screen pixel cells and the DPF pixel cells respectively, which both have Y row by X column pixel cells aligned to each other by row and by column. Data buffer 820 and 821 or data matrix Sm and Sa may be in various forms, such as computer virtual memory and physical memory chips or the like. Sm[x, y] is the actual image data signal that is rendered on the main screen in one to one base. Sa[x, y] is the actual image data signal that is rendered on the DPF in one to one base. 825 and 824 are the sub data blocks for the area on the main screen and the adjusting screen respectively where observer sees 2-D image 801. Sm[p, q] and Sa[p, q] are the corresponding sub data matrix represents data in area 825 and 824. 822 and 823 are the sub data blocks for the area on the main screen and the DPF respectively where observer sees 3-D image formed by 802 and 803 together. Sm[i, j] and Sa[i, j] are the corresponding sub data matrix represents data in area 822 and 823.

The data Sm[p, q] has the value of A[p, q]. Sa[p, q] has the normalized value of 0.5. If the maximum possible value of matrix A, L and R is M, Sa[p, q] then has the constant value of M/2. Sm[i, j] has the normalized sum of value L[i, j] and value R[i, j], which is the value of (L[i, j]+R[i, j])/2. Sa[i, j] has the value of M*L[i, j]/(L[i, j]+R[i, j]) if the polarization axis direction 153 of 3-D glasses 104 is arranged to completely block the light to left eye when data value zero is rendered on adjusting screen, Sa[i, j] has the value of M*R[i, j]/(L[i, j]+R[i, j]) if the polarization axis direction 153 of 3-D glasses 104 is arranged to completely pass the light to left eye when data value zero is rendered on adjusting screen.

Sm[x, y] and Sa[x, y] is the data of the area that is not covered by 825, 822, 823 and 824. The value of Sm[x, y] is 0 and the value of Sa[x, y] is undefined or may be any value, if main screen emits no light when data value zero is rendered on main screen. The value of Sm[x, y] is maximum possible value M and the value of Sa[x, y] is undefined or may be any value, if main screen emits maximum light when data value zero is rendered on main screen.

In data processing disclosed above, a pixel image data that represented as an element in matrix is actually comprised with a grouped value of each color components in a selected primary color set. For example if color red, green and blue is chosen as primary color set, a matrix element data is comprised by three sub data element r, g, and b, which represents value of color component red, green, and blue respectively that defines the corresponding pixel color. Further more, the matrix data element value setting and calculation are also color component based. For example if L[i, j] is expanded as (r1, g1, b1) and R[i, j] is expanded as (r2, g2, b2), the value (L[i, j]+R[i, j])/2 is accordingly expanded as ((r1+r2)/2, (g1+g2)/2, (b1+b2)/2).

The control signals used in this invented display may be generated remotely or locally. In remote mode, the display takes two image data streams for the main screen and DPF simultaneously. The signal data in the streams has already been preprocessed by software or a separate hardware from regular 2-D image data streams, so the display simply renders them to main display screen and DPF accordingly. For pure 2-D image display, only main screen data stream is provided and rendered. In local mode, the display takes two regular 2-D image data streams. The signal data in the streams represents regular left and right image respectively. The display converts the two input stream data in real time mode to two control stream signals based on the control signal equations disclosed here and renders them to main screen and adjusting screen accordingly. For pure 2-D image display, only one 2-D image data stream is feed to the display.

Figure 9:
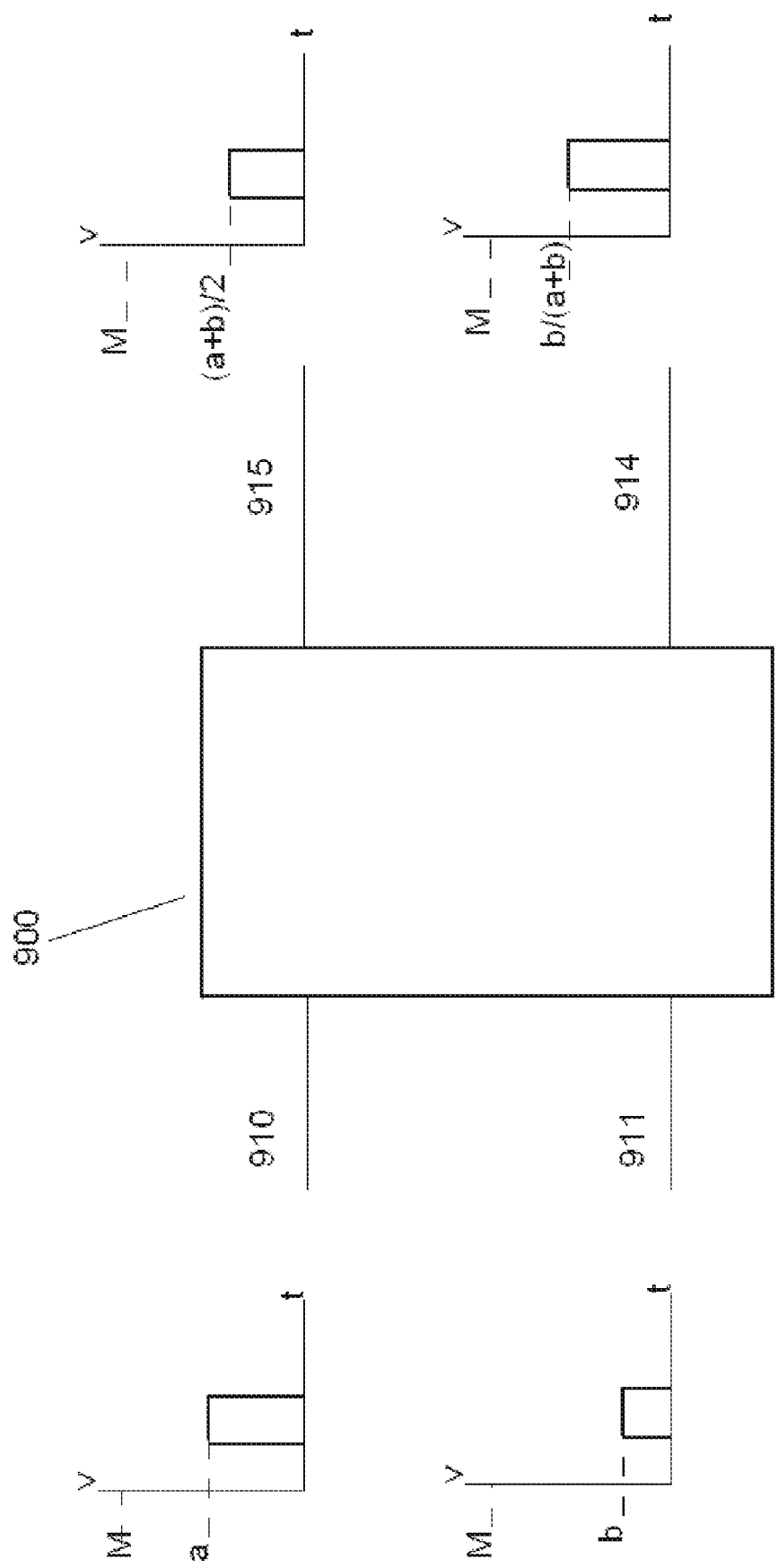

FIG. 9 is a functional diagram of dual control signal converter 900, which may be a part of display, or an independent hardware adaptor, or a component unit builds into other devices, such as computer video card or TV signal station or the like. 910 and 911 are the two regular 2-D image data stream input with maximum signal value M. 915 and 914 are the control signal data stream output with maximum signal value M as well. Main data stream 915 feeds to main display screen and adjusting data stream 914 feeds to DPF. The display takes them as a regular 2-D data streams and renders them to both display screens as if they are regular 2-D images. Unit 900 takes 901 and 902 as its input A and B, its output signal 915 has value (A+B)/2 and its output 914 has value M*B/(A+B) or M*A/(A+B) when both A and B is presented; and its output signal 915 has value (A+B) and its output signal 914 has any value from 0 to M when only A or B is presented. A constant value M/2 for output 914 is the best so that 2-D image on the screen can be observed to both eyes with or without wearing 3-D polarize glasses.

Figure 10:
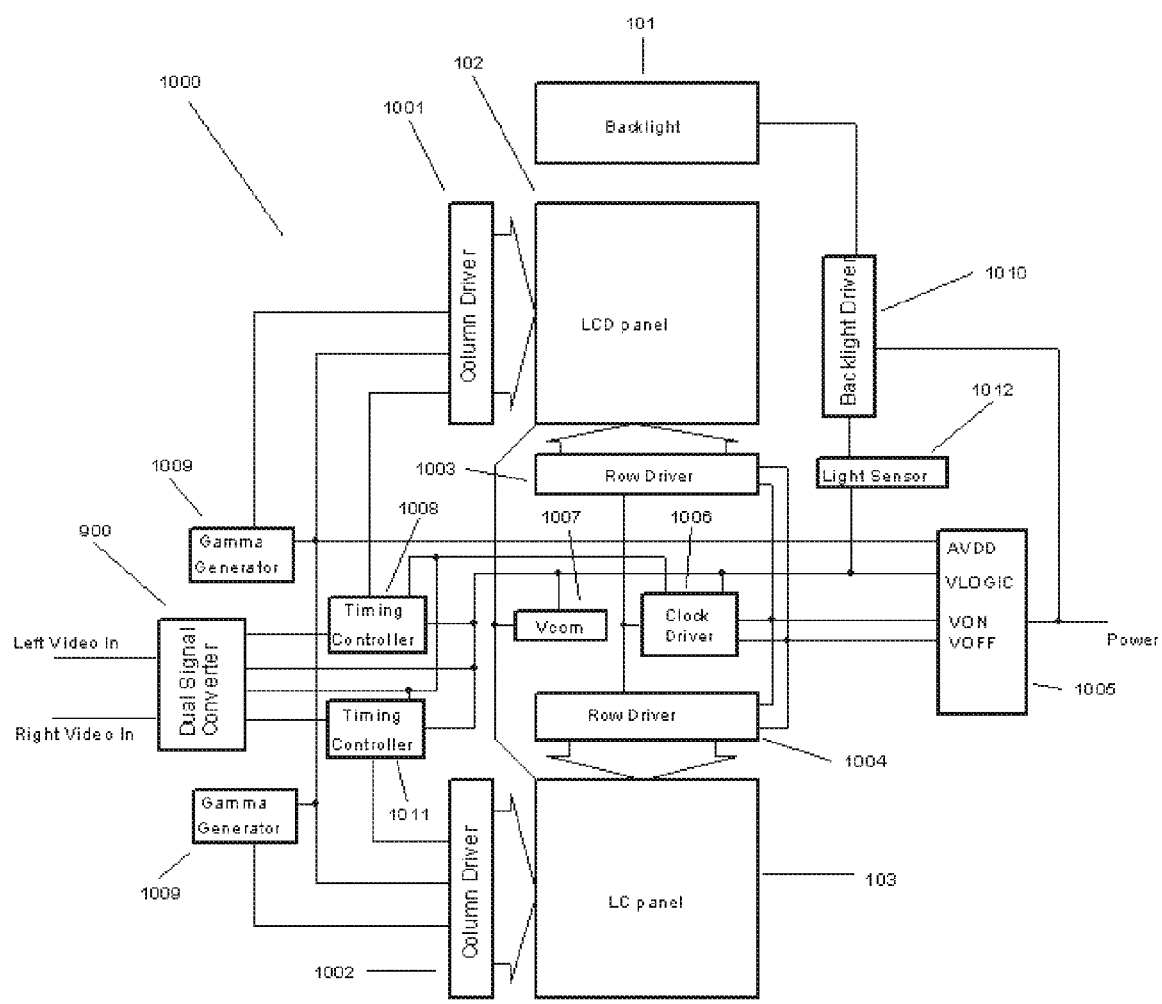
FIG. 10 is a functional diagram of a LCD based display embodiment. It comprises backlight unit 101, main display panel 102, which is a regular LCD panel with its more detail layer structure in FIG. 3, adjusting display panel 103, which is a Dual Polarizing Filter with its more detail layer structure in FIG. 2.

FIG. 10 is a functional diagram of a LCD based display embodiment. It comprises backlight unit 101, main display panel 102, which is a regular LCD panel with its more detail layer structure in FIG. 3, adjusting display panel 103, which is a Dual Polarizing Filter with its more detail layer structure in FIG. 2. Both main display panel 102 and adjusting display panel 103 has their independent column driver 1001, 1002 and independent row driver 1003, 1004 respectively. Column driver 1001 applies main data stream 915 in FIG. 9 on main display panel 102 under control of timing controller 1008 and column driver 1002 applies adjusting data stream 914 in FIG. 9 on adjusting display panel 103 under control of timing controller 1011. Row driver 1003 and 1004 provides scan signal to main panel 102 and adjusting panel 103 under control of clock driver 1006. Clock driver 1006 also synchronizes the scan signal and data signals through timing controller 1008 and 1011 to perform the image rendering on both main panel 102 and adjusting panel 103. Besides, display 1000 comprises supporting units. Power unit 1005 provides multiple power sources, common voltage unit 1007 provides common electrical voltage to both common electrode layer 116 and 126 of main panel 102 and 103 in FIG. 3. Gamma generator 1009 translates digital data signal to linear light pass through reaction on display panel, which may be replaced by a simple string of resistors in some cases. Backlight driver 1010 and light sensor 1012 provides backlight controlling. Dual control signal converter 900 may be a part of display 1000 when display 1000 takes regular 2-D data stream 910 and/or 911 in FIG. 9 as input, its more detail functional structure is disclosed in FIG. 9. It may also exist apart from the display 1000 when display 1000 takes pre-converted main data stream 915 and adjusting data stream 914 in FIG. 9 as direct input stream.

An embodiment may also be constructed with completely separate controlling units. Reference to FIG. 10, besides of independent column and row drivers, an embodiment may also comprise separate clock driver 1006, separate common voltage unit 1007, even separate power unit 1005. This altered arrangement may not affect display's functionality.

While the preferred embodiment and various alternative embodiments of the invention have been disclosed and described in detail herein, it may be apparent to those skilled in the art that various changes in form and detail may be made therein without departing from the spirit and scope thereof.

I claim:

1. A display device, comprising:
a light volume controller comprising multiple pixel cells, the multiple pixel cells comprising at least one sub-pixel cell;
a Dual Polarizing Filter comprising multiple pixel cells and at least one individual control unit, the at least one sub-pixel cells on the light volume controller and the at least one individual control unit on the Dual Polarizing Filter mapped and aligned one-to-one, each of the at least one sub-pixel cell on the light volume controller delivering a total light amount that passes through a corresponding individual control unit on the Dual Polarizing Filter, each individual control unit on the Dual Polarizing Filter changing polarized light status when light passes through it;
a polarizer, for converting light emitted from the light controller, if not polarized light, to polarized light before entering the Dual Polarizing Filter; and
polarized glasses, for filtering light emitting from each individual control unit on the Dual Polarizing Filter into two portions, one portion of the light emitting from each individual control unit on the Dual Polarizing Filter forms first image, and the other portion of the light forms second image,
wherein first image data representing the first image comprises at least one sub-region, and second image data representing the second image comprises at least one sub-region, and at least one sub-region of the first image data and at least one sub-region of the second image data represents an image region having the same geometry shape and same corresponding location coordinates on the first and second images, respectively, the at least one sub-region of the first image data and at least one sub-region of the second image data being mapped to each other accordingly such that when the first and the second images are logically overlapped, a 2D vision is formed on said image region when the corresponding sub-region of the first image data and sub-region of the second image data contains the same data, and a 3D vision is formed on said region when the corresponding sub-region of the first image data and the second image data contains stereo-pair image data.

2. A display device for generating an image, comprising:
a light volume controller for emitting a controlled volume of light from multiple pixel cells, the multiple pixel cells comprising at least one sub-pixel cell;
a Dual Polarizing Filter comprising multiple pixel cells and at least one individual control unit, the at least one sub-pixel cells on the light volume controller and the at least one individual control unit on the Dual Polarizing Filter mapped and aligned one-to-one, each of the at least one sub-pixel cell on the light volume controller delivering a total light amount that passes through a corresponding individual control unit on the Dual Polarizing Filter, each individual control unit on the Dual Polarizing Filter changing polarized light status when light passes through it; and
a polarizer, for converting light emitted from the light controller, if not polarized light, to polarized light before entering the Dual Polarizing Filter,
wherein each of the at least one individual control unit on the Dual Polarizing Filter selectively changes polarized light orientation θ degrees from its original orientation, where θ has value from 0 to 90 degrees.

3. A display device of claim 2, further comprising:
polarized glasses, for filtering light emitting from each individual control unit on the Dual Polarizing Filter into two portions, one portion of the light emitting from each individual control unit on the Dual Polarizing Filter forms first image, and the other portion of the light forms second image.

4. The display device of claim 2, wherein the light volume controller comprises one of an LCD monitor, a PDP display, an OLED display, an LCD panel in an LCD projector, and a DLP chip in a DLP projector.

5. A display device, comprising:
a light volume controller comprising multiple pixel cells, the multiple pixel cells comprising at least one sub-pixel cell;
a Dual Polarizing Filter comprising multiple pixel cells and at least one individual control unit, the at least one sub-pixel cells on the light volume controller and the at least one individual control unit on the Dual Polarizing Filter mapped and aligned one-to-one, each of the at least one sub-pixel cell on the light volume controller delivering a total light amount that passes through a corresponding individual control unit on the Dual Polarizing Filter, each individual control unit on the Dual Polarizing Filter changing polarized light status when light passes through it;

a polarizer, for converting light emitted from the light controller, if not polarized light, to polarized light before entering the Dual Polarizing Filter; and polarized glasses, for filtering light emitting from each individual control unit on the Dual Polarizing Filter into two portions, one portion of the light emitting from each individual control unit on the Dual Polarizing Filter forms first image, and the other portion of the light forms second image, wherein the polarized glasses have two lenses, the two lenses of the polarized glasses have perpendicular polarization axis, and one of the polarization axis is in parallel with the polarization orientation of the polarized light incident into the Dual Polarize Filter, and first portion of polarized light emitting from an individual control unit on the Dual Polarizing Filter passes through the first lens while second portion of polarized light emitting from the same individual control unit on the Dual Polarizing Filter passes through the second lens, and the first portion of the polarized light passes through the first lens has a volume of $\cos(\theta)*\cos(\theta)$ of a total intensity of polarized light emitting from the individual control unit on the Dual Polarizing Filter, and the second portion of the polarized light passes through the second lens has a volume of $\sin(\theta)*\sin(\theta)$ of a total intensity of polarized light emitting from the same individual control unit on the Dual Polarizing Filter, and the light passing through the first lens forms first image, and the light passing through the second lens forms second image, where $\theta$ is orientation difference between the polarized light incident into and the polarized light emitting out of the individual control unit on the Dual Polarizing Filter.

6. A display device, comprising:

a light volume controller comprising multiple pixel cells, the multiple pixel cells comprising at least one sub-pixel cell;

a Dual Polarizing Filter comprising multiple pixel cells and at least one individual control unit, the at least one sub-pixel cells on the light volume controller and the at least one individual control unit on the Dual Polarizing Filter mapped and aligned one-to-one, each of the at least one sub-pixel cell on the light volume controller delivering a total light amount that passes through a corresponding individual control unit on the Dual Polarizing Filter, each individual control unit on the Dual Polarizing Filter changing polarized light status when light passes through it;

a polarizer, for converting light emitted from the light controller, if not polarized light, to polarized light before entering the Dual Polarizing Filter; and polarized glasses, for filtering light emitting from each individual control unit on the Dual Polarizing Filter into two portions, one portion of the light emitting from each individual control unit on the Dual Polarizing Filter forms first image, and the other portion of the light forms second image, wherein the light volume controller is applied with first basic control data C1 constructed from first and second image data, where control data C1 for each sub-pixel cell on the light volume controller is $(D1+D2)/2$, where D1 is a sub-pixel data value of the first image data representing the first image when rendered on that sub-pixel cell, and D2 is a sub-pixel data value of the second image data representing the second image when rendered on that same sub-pixel cell, wherein the Dual Polarizing Filter is applied with second basic control data C2 constructed from the first image data and the second image data, where the control data C2 for each individual control unit on the Dual Polarizing Filter is one of $T*D1/(D1+D2)$ and $T*D2/(D1+D2)$, where T is the logical maximum value of D1 or D2.

7. The display device of claim 6, wherein the control data C1 and C2 are calculated dynamically using the synchronized image data D1 and D2 when they are fed into the display device for rendering.

8. The display device of claim 6, where the control data C1 or C2 are pre-calculated and saved in a block of memory and are mapped by D1 and D2 at run time to render on respective sub-pixel cells on the light controller or to render on corresponding individual control unit on the Dual Polarizing Filter, respectively, when D1 and D2 are fed into the display device for the first and the second image rendering.

9. The display device of claim 8, wherein at least one of a pre-calculated basic control data value C1 and C2 is stored at a memory element, the corresponding image data value D1 and D2 constructs one of an access address and an access index, where one of D1 and D2 comprises higher bits of one of the access address and the access index and the other of D1 and D2 comprises lower bits of one of the access address and the access index.

10. The display device of claim 8, wherein a liquid crystal liner-correction value B is defined as a function of at least one of C1 and C2 which are functions of D1 and D2, and therefore the liquid crystal liner-correction value B is a function of D1 and D2, the liquid crystal liner-correction value B is combined with basic control value C1 or C2 for correction and the combined value of liquid crystal liner-correction value B and one of the basic control value C1 and the basic control value C2 is saved in said block of memory.

11. The display device of claim 6, wherein a liquid crystal liner-correction value B is stored in a separate memory block addressed or indexed by basic control value C1 or C2, and value B is added into C1 or C2 respectively and the sum value applied to sub-pixel cell on the light volume controller and individual control unit on the Dual Polarizing Filter respectively.

12. The display device of claim 3, wherein the display device receives first and second image data streams in parallel, the first and second image data streams comprise a sequence of image data D1 and D2 accordingly along with frame synchronization and line synchronization signals, the display device generates two control data streams C1 and C2 for rendering to the light volume controller and the Dual Polarizing Filter at the same bit rate as the first and second image data streams.

13. The display device of claim 2, wherein the polarized glasses have two lenses, the two lenses of the polarized glasses have the same orientation polarization axes, one image rendered on the Dual Polarizing Filter is observed through the polarized glasses, the other image rendered on the light volume controller is observed without the polarized glasses, and the two images can be different.

14. A method for generating an image, comprising the steps of:

controlling at least a portion of an image with a light volume controller comprising multiple pixel cells, the multiple pixel cells comprising at least one sub-pixel cell, selectively changing polarized light status of at least a portion of an image using a Dual Polarizing Filter comprising multiple pixel cells and at least one individual control unit, the at least one sub-pixel cells on the light volume controller and the at least one individual control unit on the Dual Polarizing Filter mapped and aligned one-to-one, each of the at least one sub-pixel cell on the light volume controller delivering a total light amount that passes through a corresponding individual control unit on the Dual Polarizing Filter, each individual control unit on the Dual Polarizing Filter changing polarized light status when light passes through it, converting light emitted from the light controller, if not polarized light, to polarized light, using a polarizer, before entering the Dual Polarizing Filter, and selectively changing polarized light orientation in each of the at least one individual control unit on the Dual Polarizing Filter θ degrees from its original orientation, where θ has value from 0 to 90 degrees.

15. The method of claim 14, further comprising the step of:

filtering light emitting from each individual control unit on the Dual Polarizing Filter using polarized glasses, into two portions, one portion of the light emitting from each individual control unit on the Dual Polarizing Filter forms first image, and the other portion of the light forms second image.

16. A method for generating an image, comprising the steps of:

controlling at least a portion of an image with a light volume controller comprising multiple pixel cells, the multiple pixel cells comprising at least one sub-pixel cell, selectively changing polarized light status of at least a portion of an image using a Dual Polarizing Filter comprising multiple pixel cells and at least one individual control unit, the at least one sub-pixel cells on the light volume controller and the at least one individual control unit on the Dual Polarizing Filter mapped and aligned one-to-one, each of the at least one sub-pixel cell on the light volume controller delivering a total light amount that passes through a corresponding individual control unit on the Dual Polarizing Filter, each individual control unit on the Dual Polarizing Filter changing polarized light status when light passes through it, and converting light emitted from the light controller, if not polarized light, to polarized light, using a polarizer, before entering the Dual Polarizing Filter, and filtering light emitting from each individual control unit on the Dual Polarizing Filter using polarized glasses, into two portions, one portion of the light emitting from each individual control unit on the Dual Polarizing Filter forms first image, and the other portion of the light forms second image;

wherein first image data representing the first image comprises at least one sub-region, and second image data representing the second image comprises at least one sub-region, and at least one sub-region of the first image data and at least one sub-region of the second image data represents an image region having the same geometry shape and same corresponding location coordinates on the first and second images, respectively, the method further comprising the step of:

mapping the at least one sub-region of the first image data and at least one sub-region of the second image data to each other accordingly such that when the first and the second images are logically overlapped, a 2D vision is formed on said image region when the corresponding sub-region of the first image data and sub-region of the second image data contains the same data, and a 3D vision is formed on said image region when the corresponding sub-region of the first image data and the second image data contains stereo-pair image data.

17. The method of claim 15, wherein the light volume controller comprises one of an LCD monitor, a PDP display, an OLED display, an LCD panel in an LCD projector, and a DLP chip in a DLP projector.

18. A method for generating an image, comprising the steps of:

controlling at least a portion of an image with a light volume controller comprising multiple pixel cells, the multiple pixel cells comprising at least one sub-pixel cell, selectively changing polarized light status of at least a portion of an image using a Dual Polarizing Filter comprising multiple pixel cells and at least one individual control unit, the at least one sub-pixel cells on the light volume controller and the at least one individual control unit on the Dual Polarizing Filter mapped and aligned one-to-one, each of the at least one sub-pixel cell on the light volume controller delivering a total light amount that passes through a corresponding individual control unit on the Dual Polarizing Filter, each individual control unit on the Dual Polarizing Filter changing polarized light status when light passes through it, and converting light emitted from the light controller, if not polarized light, to polarized light, using a polarizer, before entering the Dual Polarizing Filter, and filtering light emitting from each individual control unit on the Dual Polarizing Filter using polarized glasses, into two portions, one portion of the light emitting from each individual control unit on the Dual Polarizing Filter forms first image, and the other portion of the light forms second image;

wherein the polarized glasses have two lenses, the two lenses of the polarized glasses have perpendicular polarization axis, and one of the polarization axis is in parallel with the polarization orientation of the polarized light incident into the Dual Polarize Filter, the method further comprising the steps of:

the first portion of polarized light emitting from an individual control unit on the Dual Polarizing Filter passing through the first lens, the second portion of polarized light emitting from the same individual control unit on the Dual Polarizing Filter passing through the second lens, where the first portion of the polarized light passes through the first lens has a volume of $\cos(\theta)*\cos(\theta)$ of a total intensity of polarized light emitting from the individual control unit on the Dual Polarizing Filter, the second portion of the polarized light passes through the second lens has a volume of $\sin(\theta)*\sin(\theta)$ of a total intensity of polarized light emitting from the same individual control unit on the Dual Polarizing Filter, and light passing through the first lens forms first image, and light passing through the second lens forms second image, where θ is orientation difference between the polarized light incident into and the polarized light emitting out of the individual control unit on the Dual Polarizing Filter.

19. A method for generating an image, comprising the steps of:

controlling at least a portion of an image with a light volume controller comprising multiple pixel cells, the multiple pixel cells comprising at least one sub-pixel cell, selectively changing polarized light status of at least a portion of an image using a Dual Polarizing Filter comprising multiple pixel cells and at least one individual control unit, the at least one sub-pixel cells on the light volume controller and the at least one individual control unit on the Dual Polarizing Filter mapped and aligned one-to-one, each of the at least one sub-pixel cell on the light volume controller delivering a total light amount that passes through a corresponding individual control unit on the Dual Polarizing Filter, each individual control unit on the Dual Polarizing Filter changing polarized light status when light passes through it, and converting light emitted from the light controller, if not polarized light, to polarized light, using a polarizer, before entering the Dual Polarizing Filter, filtering light emitting from each individual control unit on the Dual Polarizing Filter using polarized glasses, into two portions, one portion of the light emitting from each individual control unit on the Dual Polarizing Filter forms first image, and the other portion of the light forms second image;

applying first basic control data C1 constructed from first and second image data to the light volume controller, where control data C1 for each sub-pixel cell on the light volume controller is (D1+D2)/2, where D1 is a sub-pixel data value of the first image data representing the first image when rendered on that sub-pixel cell, and D2 is a sub-pixel data value of the second image data representing the second image when rendered on that same sub-pixel cell, and applying second basic control data C2 constructed from the first image data and the second image data to the Dual Polarizing Filter, where the control data C2 for each individual control unit on the Dual Polarizing Filter is one of T*D1/(D1+D2) and T*D2/(D1+D2), where T is the logical maximum value of D1 or D2.

20. The method of claim 19, further comprising the step of:

calculating the control data C1 and C2 dynamically using the synchronized image data D1 and D2 when they are fed for rendering.

21. The method of claim 19, further comprising the steps of:

pre-calculating the control data C1 or C2, saving the control data C1 or C2 in a block of memory, and mapping the control data C1 or C2 by D1 and D2 at run time to render on respective sub-pixel cells on the light controller or to render on corresponding individual control unit on the Dual Polarizing Filter, respectively, when D1 and D2 are fed for the first and the second image rendering.

22. The method of claim 21, further comprising the steps of:

storing at least one of a pre-calculated basic control data value C1 and C2 in a memory element, and constructing an access address or access index for the memory element from the corresponding image data value D1 and D2, where one of D1 and D2 comprises higher bits of one of the access address and the access index and the other of D1 and D2 comprises lower bits of one of the access address and the access index.

23. The method of claim 21, further comprising the steps of:

defining a liquid crystal liner-correction value B as a function of at least one of C1 and C2 which are functions of D1 and D2, and therefore the liquid crystal liner-correction value B is a function of D1 and D2, and combining the liquid crystal liner-correction value B with basic control value C1 or C2 for correction, and saving the combined value of liquid crystal liner-correction value B and one of the basic control value C1 and the basic control value C2 in said block of memory.

24. The method of claim 19, further comprising the steps of:

storing a liquid crystal liner-correction value B in a separate memory block addressed or indexed by basic control value C1 or C2, adding value B into C1 or C2 respectively, and applying sum value of B and C1 or C2 to a sub-pixel cell on the light volume controller or an individual control unit on the Dual Polarizing Filter, respectively.

25. The method of claim 14, further comprising the steps of:

receiving first and second image data streams in parallel, the first and second image data streams comprising a sequence of image data D1 and D2, accordingly, along with frame synchronization and line synchronization signals, and generating two control data streams, C1 and C2, for rendering to the light volume controller and the Dual Polarizing Filter at the same bit rate as the first and second image data streams.

26. The method of claim 15, wherein the polarized glasses have two lenses, the two lenses of the polarized glasses have the same orientation polarization axes, the method further comprising the steps of:

observing one image rendered on the Dual Polarizing Filter through the polarized glasses, and observing the other image rendered on the light volume controller without the polarized glasses, where the two images can be different.

* * * * *